United States Patent
Hsiao et al.

(10) Patent No.: US 10,066,065 B2
(45) Date of Patent: Sep. 4, 2018

(54) METHOD FOR MANUFACTURING NANO-STRUCTURALLY ALIGNED MULTI-SCALE COMPOSITES

(71) Applicant: UNIVERSITY OF SOUTH ALABAMA, Mobile, AL (US)

(72) Inventors: Kuang-Ting Hsiao, Spanish Fork, AL (US); Gregory Hickman, University City, MO (US)

(73) Assignee: THE UNIVERSITY OF SOUTH ALABAMA, Mobile, AL (US)

( * ) Notice: Subject to any disclaimer, the term of this patent is extended or adjusted under 35 U.S.C. 154(b) by 324 days.

(21) Appl. No.: 14/908,265

(22) PCT Filed: Jul. 28, 2014

(86) PCT No.: PCT/US2014/048406
§ 371 (c)(1),
(2) Date: Jan. 28, 2016

(87) PCT Pub. No.: WO2015/017321
PCT Pub. Date: Feb. 5, 2015

(65) Prior Publication Data
US 2016/0168342 A1    Jun. 16, 2016

Related U.S. Application Data

(60) Provisional application No. 61/958,485, filed on Jul. 29, 2013.

(51) Int. Cl.
| | | |
|---|---|---|
| C08J 5/24 | (2006.01) |
| B29C 70/08 | (2006.01) |
| C08J 5/04 | (2006.01) |
| B29C 39/42 | (2006.01) |
| B29C 70/44 | (2006.01) |
| B29C 70/24 | (2006.01) |
| C08K 7/14 | (2006.01) |
| B32B 27/04 | (2006.01) |
| B32B 27/20 | (2006.01) |
| B32B 27/38 | (2006.01) |
| B29K 105/12 | (2006.01) |
| B29K 105/16 | (2006.01) |
| C08K 7/06 | (2006.01) |

(52) U.S. Cl.
CPC .............. C08J 5/042 (2013.01); B29C 39/42 (2013.01); B29C 70/081 (2013.01); B29C 70/24 (2013.01); B29C 70/443 (2013.01); C08J 5/043 (2013.01); C08K 7/14 (2013.01); *B29K 2105/124* (2013.01); *B29K 2105/162* (2013.01); *B29K 2105/167* (2013.01); *C08J 2363/00* (2013.01); *C08K 7/06* (2013.01)

(58) Field of Classification Search
CPC .......... C08J 5/24; B29C 70/081; B32B 27/04; B32B 27/20; B32B 27/38
USPC ................... 428/297.4, 298.1, 299.1, 300.4
See application file for complete search history.

(56) References Cited

U.S. PATENT DOCUMENTS

| | | |
|---|---|---|
| 5,468,358 A | 11/1995 | Ohkawa et al. |
| 5,873,973 A | 2/1999 | Koon et al. |
| 2004/0265489 A1 | 12/2004 | Dubin |
| 2005/0277721 A1 | 12/2005 | Smith et al. |
| 2008/0075954 A1 | 3/2008 | Wardle et al. |
| 2009/0311166 A1 | 12/2009 | Hart et al. |
| 2010/0203351 A1 † | 8/2010 | Nayfeh |
| 2013/0108826 A1 | 2/2013 | Chakravarthi |
| 2017/0182718 A1 * | 6/2017 | Hsiao ................... B29C 70/081 |
| 2017/0240715 A1 * | 8/2017 | Hsiao ................... C08J 9/0076 |

FOREIGN PATENT DOCUMENTS

| | | | |
|---|---|---|---|
| RU | 2468918 C1 * | 12/2012 | ............. B29C 70/02 |
| WO | 2009077524 A2 | 6/2009 | |

OTHER PUBLICATIONS

Machine translation of RU 2468918 C1 (no date).*
Micah CL McCrary-Dennis; Okwnwa I. Okoli: "A Review of Multiscale Composite Manufacturing Challenges" Journal of Reinforced Plastics and Composites, vol. 31, No. 24, (Oct. 24, 2012), p. 1687-1711.
Bradford, Philip D., et al. "A novel approach to fabricate high volume fraction nanocomposites with long aligned carbon nanotubes." Composites Science and Technology 70.13 (2010): 1980-1985.†
Abdalla, Mohamed, et al. "Magnetically processed carbon nanotube/epoxy nanocomposites: morphology, thermal, and mechanical properties." Polymer 51.7 (2010): 1614-1620.†

* cited by examiner
† cited by third party

*Primary Examiner* — Michael J Feely
(74) *Attorney, Agent, or Firm* — J. M. Robertson, LLC (57) ABSTRACT

A method whereby nanostructures aligned within a matrix material to define an aligned admixture are transferred into a receiving porous medium while substantially maintaining the nanostructure alignment such that the nanostructures may be aligned predominantly in a common direction within receiving porous medium. Resulting composite structures are also provided.

18 Claims, 10 Drawing Sheets

METHOD FOR MANUFACTURING NANO-STRUCTURALLY ALIGNED MULTI-SCALE COMPOSITES

CROSS-REFERENCE TO RELATED APPLICATIONS

This non-provisional application is a National Phase of International Application Number PCT/US2014/048406, filed Jul. 28, 2014 and claims the benefit of, and priority from, U.S. provisional application 61/958,485 filed Jul. 29, 2013. The contents of such prior application and all documents referenced herein are hereby incorporated by reference in their entirety as if fully set forth herein.

TECHNICAL FIELD

This disclosure relates generally to a method for manufacturing a nano-structured, multi-scale, composite that results in a composite having improved integrity. More particularly, the present disclosure relates to a method of providing aligned high-aspect-ratio nanostructures dispersed in a matrix material, transferring the admixture of aligned nanostructures and matrix material into an adjacent receiving porous medium and then solidifying the matrix material within the receiving porous medium while substantially maintaining the nanostructure alignment.

BACKGROUND

Composites incorporating nano-scale particles are well known. Nanomaterials is a field that takes a materials science-based approach on nanotechnology. Materials incorporating nanoscale structures may have unique properties stemming from morphological features with nanoscale dimensions. In this regard, the term "nanoscale" is often defined as smaller than 1 nanometer in at least one dimension. However, in practice and in existing commercial products, some nanostructures may have their smallest dimensions significantly larger than 1 nanometer. On the other hand, recent nanotechnology development has also made some structures with dimensions substantially less than 1 nanometer. Hence, for purposes of this disclosure, it is to be understood that "nanoscale" is defined as from 0.1 nanometer to 1000 nanometers. A "nanoscale material" is a natural, incidental or manufactured material containing nanoscale structures "nanostructrures" such as fibers, particles and the like, in an unbound state or as an aggregate or agglomerate.

An important aspect of nanotechnology is the vastly increased ratio of surface area to volume present in many nanoscale materials, which makes possible new quantum mechanical effects. One example is the "quantum size effect" where the properties of solids having particles dispersed within a matrix may be altered as a result of significant reductions in particle size. By way of example only, characteristics such as electrical conductivity and optical fluorescence may be influenced significantly by the presence of nanostructures due to the dramatically increased surface area to volume ratio of those structures. These significant influences typically do not come into play by going from macro to micro dimensions. However, they become pronounced when the nanoscale size range is reached.

A certain number of physical properties also alter with the change to nanoscale systems. By way of example only, nanostructures within a bulk material can strongly influence mechanical properties of the material, such as stiffness or elasticity. In some applications of use, it has been found that traditional polymers can be reinforced by nanostructures resulting in novel materials which can be used as lightweight replacements for metals. Such nanotechnologically enhanced materials may enable a weight reduction accompanied by an increase in stability and improved functionality. Other functions such as catalytic activity for treatment of biomaterials also may be strongly influenced by the presence of nanoscale structures.

Several types of nanomaterials have been used to create advanced composite structures. Industries desiring high performance, light weight structures have increasingly focused on fiber reinforced plastic (FRP). Such FRP materials typically include a multiplicity of micro-scale fibers having an effective diameter ranging ranges from about 1 micrometer to 1000 micrometers. In practice, such micro-scale fibers can be orientated in any preferred in-plane direction within the FRP laminate to reinforce the strength of the FRP laminate in the preferred in-plane direction. Some special FRP laminate parts may have the micro-scale fibers not orientated in any in-plane direction due to the special design needs or due to the non-uniform thickness of the FRP laminate parts such as a tapered geometry or the like. FRP materials are considered superior to their metallic counterparts due to their high strength-to-weight ratios. However, improvements in the durability and damage tolerance of these light-weight materials are still desired because of the relative weakness of the binding polymer matrix in FRP laminates. In this regard, the weakness of most FRP laminates is caused by the lack of effective fiber reinforcement in the direction perpendicular to the local micro-scale fiber orientation. For example, in a typical FRP laminate with micro-scale fibers orientated in the in-plane direction, the weak direction is the through-thickness direction. As a result, many through-thickness-direction related properties of FRP laminates are dominated by the properties of the polymer matrix, rather than by the fibers.

Several studies have demonstrated that the appropriate addition of nanostructures such as nanofibers, nanotubes, nanorods, or nanoplatelets to a polymer matrix can drastically enhance the polymer matrix performance. When introducing nanostructures to improve performance in a FRP material, there are two primary processes which can be used to improve a multi-scale composite laminate: (1) targeted reinforcement of the fiber/matrix interface; and (2) the general reinforcement of the bulk matrix. Reinforcement of the interface may be achieved by the deposition of nanostructures on the surface of the continuous fiber systems. Exemplary deposition processes include electrophoresis, chemical vapor deposition, and sizing. Bulk matrix reinforcement is typically done by adding nanostructures into the matrix solution before impregnation of the micro-scale fiber system thereby forming a so called "nanocomposite".

Despite the advancements made in the synthesis of these nanocomposites, the technology remains at a very early stage where systematic improvement has yet to be achieved. It is believed that the lack of high-aspect-ratio nanostructure orientation control (i.e., alignment) certainly diminishes the effectiveness of the high-aspect-ratio nanostructure reinforcement in multi-scale composites. Moreover, deposition technologies such as chemical vapor deposition (CVD) and the like are not a particularly good solution due to cost and complexity.

Examples of known high-aspect-ratio nanostructures which may be used to adjust the character of a matrix include carbon nanotubes, fibrous nanocarbons, metal nanorods, nanoclays, and graphite nanoplatelets. It is known that the alignment of high-aspect-ratio nanostructures in water or neat polymer solution can be achieved by electric or magnetic field. However, as best understood, no technique has been identified to use electric or magnetic field to achieve alignment of high-aspect-ratio nanostructures in FRP or other micro-scale composites. Without being limited to a particular theory, it is suspected that one possible reason for the inability to use electric or magnetic field treatment to align high-aspect-ratio nanostructures in FRP materials may be the undesired interference from the existing micro-scale fiber arrays in the FRP matrix.

In this disclosure the following definitions apply:

A "nanostructure" is a structure that has at least one of its dimensions within the aforesaid nanoscale range (i.e., from 0.1 nanometer to 1000 nanometers);

A "high-aspect-ratio nanostructure" is a nanostructure wherein at least one of its dimensions is at least five times longer than its smallest dimension;

A "fiberous nanocarbon" is a long-shaped, high-aspect-ratio nanostructure with a composition having a majority amount of carbon and with its effective diameter being within the aforesaid nanoscale range (i.e., from 0.1 nanometer to 1000 nanometers).

SUMMARY OF THE DISCLOSURE

The present disclosure provides advantages and alternatives over the prior art by providing a method whereby nanostructures are aligned within a matrix material to define an aligned admixture, and are then transferred into a receiving porous medium such as an FRP, fabric or the like while substantially maintaining the nanostructure alignment such that the nanostructures may be aligned predominantly in a common direction within receiving porous medium.

In accordance with one exemplary aspect, the present disclosure provides a method of aligning high-aspect-ratio nanostructures within a matrix material carried by a first porous medium to produce a through-thickness-aligned high-aspect-ratio nanostructure/matrix material admixture carried by the first porous medium and thereafter transferring the admixture with aligned nanostructures into a receiving porous medium and solidifying the matrix material while maintaining the nanostructure alignment to form a nanocomposite wherein the high-aspect-ratio nanostructures may be aligned predominantly in the through-thickness dimension of the composite.

In accordance with another exemplary aspect, the disclosure also provides exemplary methods for the transference of an admixture with aligned nanostructures into an adjacent receiving porous medium by liquefaction while maintaining the particle alignment in the through thickness dimension.

In accordance with another aspect, this disclosure provides a method of using heat control to aid in the liquefaction and solidification of a through-thickness-aligned high-aspect-ratio nanostructure/matrix material. In this regard, directional heating and cooling may be used to facilitate controlled liquefaction and solidification and to aid in alignment. liquefaction and solidification In accordance with one exemplary feature, the present disclosure provides a method of aligning high-aspect-ratio nanostructures within a matrix material to produce a through-thickness-aligned high-aspect-ratio nanostructure/matrix material admixture and thereafter transferring the admixture with aligned nanostructures into an adjacent receiving porous medium while maintaining the particle alignment in the through thickness dimension wherein the aligned high-aspect-ratio nanostructure/matrix material can change its state between solid and liquid during the composite manufacturing process.

In accordance with another exemplary feature, the matrix material may be thermoset resin or thermoplastic resin.

In accordance with another exemplary feature, the receiving porous medium may contain a micro-fiber system.

In accordance with another exemplary feature, the aligned high-aspect-ratio nanostructures may be aligned by an electric or magnetic field.

In accordance with another exemplary feature, the aligned high-aspect-ratio nanostructures can be elongated structures such as, but not limited to, fibrous nanocarbons, carbon nanotubes, and metal nanorods.

In accordance with another exemplary feature, the aligned high-aspect-ratio nanostructures can be plate-like such as but not limited to graphene, nanoplatelets and nanoclays.

In addition to providing to the desired alignment feature as mentioned above, other enabled features of the instant disclosure include (i) suitable geometry of nanostructures and (ii) favorable interaction between the nanostructures and micro-scale fiber arrays in fabrics, FRPs and the like (such as, but not limited to, interlock between high-aspect-ratio nanostructures and the micro-scale fibers, high-aspect-ratio nanostructures pull-out from the surrounding matrix and gap bridging effect by a long high-aspect-ratio nanostructure when bridging a crack in the composite) and (iii) favorable interface between the nanostructures and the matrix system that can provide good load transfer between the nanostructures and the micro-scale fiber reinforcement system at desired loading conditions such as various static loading conditions, low speed or high speed impact, etc.

It is to be understood that other aspects, advantages, and features of the disclosure will become apparent through a reading of the following detailed description of the disclosure and/or through use of the described embodiments. Accordingly, such description is to be understood to be exemplary and explanatory only and in no event is the disclosure to be limited to any illustrated and described embodiments. On the contrary, it is intended that the present disclosure shall extend to all alternatives and modifications as may embrace the principals of this disclosure within the true spirit and scope thereof.

BRIEF DESCRIPTION OF THE DRAWINGS

Exemplary embodiments of the present disclosure will now be described by way of example only, with reference to the accompanying drawings which are incorporated in and which constitute a part of this specification herein and together with the general description given above, and the detailed description set forth below, serve to explain the principles of the disclosure wherein:

FIG. is a trend line of time dependent standard deviation for the alignment of a mechanically mixed/sonicated CNF/epoxy sample in a DC electric field pulse stream at three separate field densities, wherein higher field densities provide shorter times to stability;

FIG. 8 is a schematic for an exemplary processing line for commercial scale transference of a preformed film with aligned high-aspect ratio nanostructures into a receiving porous medium such as E-glass, carbon fabric or the like;

Before the exemplary embodiments and procedures are explained in detail, it is to be understood that the invention is in no way limited in its application or construction to the details set forth in the following description or illustrated in the drawings. Rather, the invention is capable of other embodiments and of being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION

As indicated previously, the present disclosure provides a method for manufacturing a nano-structured, multi-scale, composite. According to the exemplary practice, the method includes the steps of aligning high-aspect-ratio nanostructures dispersed within a matrix material to produce a precursor nanostructure/matrix admixture having substantial through-thickness alignment of high-aspect-ratio nanostructures. The admixture may be solidified or remain in a liquid state and thereafter be flow transferred into a receiving porous medium which may include micro-scale fiber structures. The matrix material is then solidified within the receiving porous medium to form a multi-scale composite. The high-aspect-ratio nanostructures maintain their orientation within the receiving porous medium. The high-aspect-ratio nanostructures may thereby be substantially z-axis aligned and stitched through the receiving porous medium by this method. In this regard, it is to be understood that the z-axis corresponds substantially to the flow direction of the admixture while entering the receiving porous medium and is along the direction substantially normal to the surface of the receiving porous medium through which the admixture enters. Accordingly, if the receiving porous medium is oriented with its through-thickness direction also in the z-axis direction, then the high-aspect-ratio nanostructures will be aligned in the through-thickness direction of the receiving porous medium after the process has been completed.

It is to be understood that the relative orientation of the nanostructures and the through thickness direction of the receiving porous medium may be adjusted by varying the flow direction of the admixture across the receiving porous medium. That is, the relation between the z-axis direction and the receiving porous medium's through-thickness direction may be varied to achieve substantially any desired nanostructure alignment in the receiving porous medium. In this regard, it is contemplated that for many flat and uniform thickness laminates, the desired nanostructure alignment is expected to be in the through-thickness direction of the laminate. However, it should be recognized that nanostructure alignment in the through-thickness direction will not necessarily be desired for all composites.

In accordance with one exemplary practice, it has been observed that the nanostructure alignment in the admixture prior to introduction into the receiving medium may be substantially controlled by the application of a magnetic or electric field if the high-aspect-ratio nanostructures are electrically conductive or incorporate a dielectric material which can be effectively polarized. By way of example only, and not limitation, such nanostructures may include high-aspect-ratio fibrous nanocarbons including fibrous nanocarbons, carbon nanotubes, carbon nanorods and any other long-shaped nanostructures containing carbon. Any desired mixture of various nanostructures which may include combinations of high-aspect-ratio and low-aspect-ratio particles also may be used as desired.

It is contemplated that the matrix material may be any suitable polymer capable of being liquefied and subsequently resolidified. By way of example only, and not limitation, suitable matrix materials may include thermoset polymers such as those containing as a major ingredient, epoxy, polyester, vinyl ester, bismaleimides, polyimides, cyanate ester and combinations thereof. By way of further example, and not limitation, it is also contemplated that the matrix material can be a thermoplastic polymer such as those containing as a major ingredient, Nylon, thermoplastic polyesters, polycarbonate, polyacetals, polyamide-imide, polyether ether ketone (PEEK), polyphenylene sulfide, and polyetherimide and combinations thereof. It is also contemplated that the matrix material may contain fillers or ingredients other than the high-aspect-ratio nanostructures.

In accordance with one exemplary practice, the alignment of nanostructures within the admixture matrix material may be carried out within an ultra-porous medium having a porosity which is substantially higher than the porosity of the receiving porous medium. By way of example only, one such ultra porous medium is a cellulosic sponge.

In one exemplary practice, the aligned admixture may be transferred into a so called micro-scale fiber system such as a fabric or the like wherein a majority of fibers in the system are characterized by diameters in the range from 1 micrometer to 1000 micrometers. It is also contemplated that fibers in such a micro-scale fiber system may be micro-diameter ropes characterized by diameters in the range from 1 micrometer to 1000 micrometers formed from nanostructures (such as nanotubes twisted together to form microdiameter yarns). It is also contemplated that the aligned admixture may be transferred into a micro-scale fiber system such as a fabric or the like formed from materials such as, without limitation, glass fibers, carbon fibers, aramid fibers (e.g., KEVLAR®), polymer fibers (e.g., nylon and polyethylene), natural fibers (e.g., flax, jute, sisal, bamboo), boron fibers, nanotube twisted yarns, nanofiber twisted yarns, spun nanotube microfibers, spun nanofiber microfibers, ceramic fibers or any combination thereof.

According to one exemplary procedure, a solidified admixture of aligned nanostructures and matrix material may be progressively liquefied as it is flow-transferred into the receiving porous medium by the application of force to the admixture during the transfer process. By way of example only, and not limitation, such applied forces may include components of pressure force, shear force, gravity force, electrical force, magnetic force, intermolecular forces, and forces for flow in porous medium, and the like. The applied forces may act on any component of the admixture such as the nanostructures, the matrix material, the other added ingredients (such as other fillers, surfactants, chemical reaction agents, etc.) or any combination of the components of the admixture. It is also contemplated that the flow transfer of the admixture into the receiving porous medium may be adjusted by factors other than applied force, thickness control, liquefaction, laminar flow fluid and combinations thereof.

Following transference of the admixture to a receiving porous medium, the matrix material in the admixture may be solidified. In accordance with one exemplary practice, such solidification may be effected through the use of heat control. By way of example only, and not limitation, the matrix material solidification process of a thermoset polymer matrix material may be substantially carried out by heating to react the thermoset polymer to a solid state. Likewise, the matrix material solidification process of a thermoplastic polymer matrix material may be substantially carried out by cooling to turn said thermoplastic polymer to a solid state. As will be understood by those of skill in the art, for an incompletely cured thermoset resin, which is in liquid-phase above its melting temperature (i.e., melting point) and is solid when under the melting temperature, one can liquefy it by applying heat and solidify it by cooling it below the melting point like a thermoplastic resin. It is also contemplated that mechanisms other than heat control may be used to effect matrix material solidification if desired. By way of example, such alternative mechanisms may include light for photoreactive polymer materials and the like.

Figure 1:
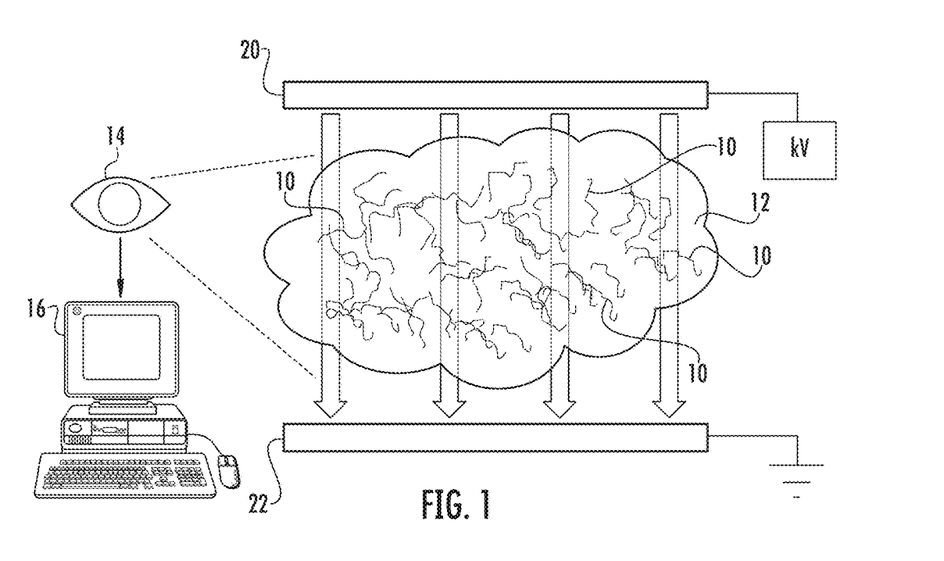
FIG. 1 is a schematic diagram of a setup for field induced alignment of electrically conductive high aspect ratio nanostructures such as fibrous nanocarbons or the like within a fluid system while analyzing particle movement.

Referring now to the figures, FIG. 1 illustrates an exemplary setup for electrical field induced alignment of nanostructures 10 such as such as high-aspect-ratio fibrous nanocarbons or the like within a surrounding matrix material 12. The setup of FIG. 1 also permits observation and recordation of the alignment process by use of a microscope or other optical sensor 14 linked to a computer 16. In this regard, the computer 16 may be used to analyze and record the relative degree of alignment of the nanostructures during application of the electrical field. Of course, it is to be understood that such observation and recordation of alignment may be useful to establish preferred operational parameters, but are in no way essential to the final practice of the alignment procedure.

In accordance with one exemplary practice, the fibrous nanocarbons may be dispersed into a liquid epoxy matrix such as EPON™ Resin 862 (Diglycidyl Ether of Bisphenol F) which is a low viscosity, liquid epoxy resin manufactured from epichlorohydrin and Bisphenol-F. This dispersion may be carried out by mechanical mixing followed by sonication. In this regard, the dispersion process of fibrous nanocarbons within epoxy for electrical field induced alignment of the fibrous nanocarbons will be understood by those of skill in the art and is detailed in the inventors' publication "QUANTITATIVE DISPERSION QUALITY ANALYSIS OF FIBROUS CARBON NANOFILLERS USING ELECTRIC FIELD ALIGNMENT." Proceedings of SAMPE 2013 (Society of the Advancement of Material and Process Engineering), Long Beach, Calif., May 6-9, 2013.), the contents of which are hereby incorporated by reference herein. It is to be understood that any suitable polymer capable of being liquefied and subsequently resolidified may be used as the matrix material including, by way of example only, and not limitation, thermoset polymers such as those containing as a major ingredient, epoxy, polyester, vinyl ester, bismaleimides, polyimides, cyanate ester and combinations thereof, and thermoplastic polymers such as those containing as a major ingredient, Nylon, thermoplastic polyesters, polycarbonate, polyacetals, polyamide-imide, polyesther ether ketone (PEEK), polyphenylene sulfide, and polyetherimide and combinations of thereof.

Figure 2:
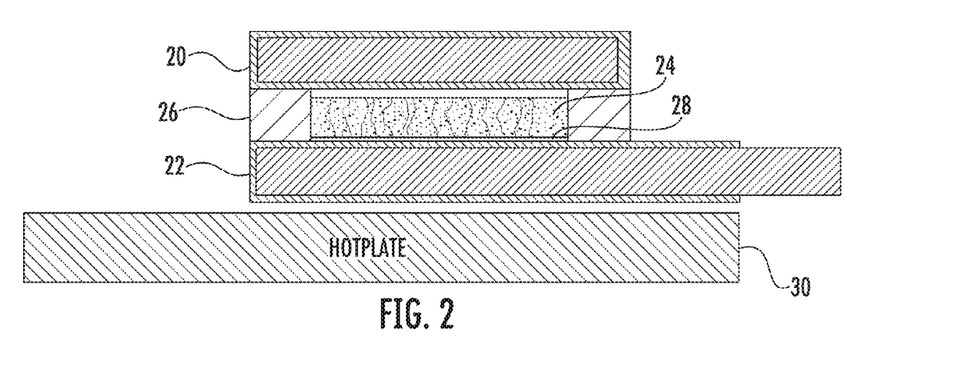
FIG. 2 is a schematic cross-sectional view illustrating an exemplary setup for electric field induced alignment of fibrous nanocarbons (Fibrous nanocarbons) within epoxy solution using a porous sponge as the containment medium.

As illustrated through joint reference to FIGS. 1 and 2, in accordance with one exemplary practice, the admixture of fibrous nanocarbons or other high-aspect-ratio nanostructures within epoxy or other suitable matrix material may be subjected to an electrical field established by a potential difference between a charge plate 20 and an opposing ground plate 22. By way of example only, and not limitation, the electric field may be established by use of a high voltage DC power supply having an output of 0 to 25 kV linked to a relay controlled by a programmable logic controller (PLC). According to one exemplary practice, the power supply is switched on and off continuously by opening and closing the relay in response to commands from the PLC to generate a square wave output at a frequency of about 0.01 HZ to about 1 Hz. Of course, different voltage potentials and frequencies may be used as desired.

As indicated previously, the exemplary high-aspect-ratio nanostructures are electrically conductive or incorporate a dielectrical material which can be effectively polarized, By way of example only, and not limitation, such nanostructures may include fibrous nanocarbons, carbon nanotubes, carbon nanorods and any other long-shaped nanostructures containing carbon with or without metal additives or impurities. Since the nanostructure material is much more conductive than the epoxy or other matrix material, the electric field will force the high-aspect-ratio nanostructures to align substantially along the electric field direction running perpendicular to the charge plate 20 and the ground plate 22 as shown by the arrows in FIG. 1.

Figure 3:
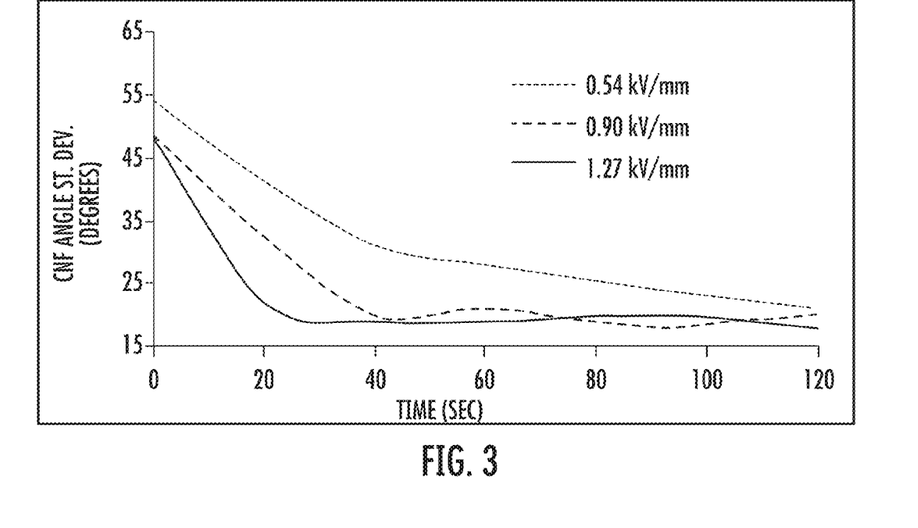
Figure 4:
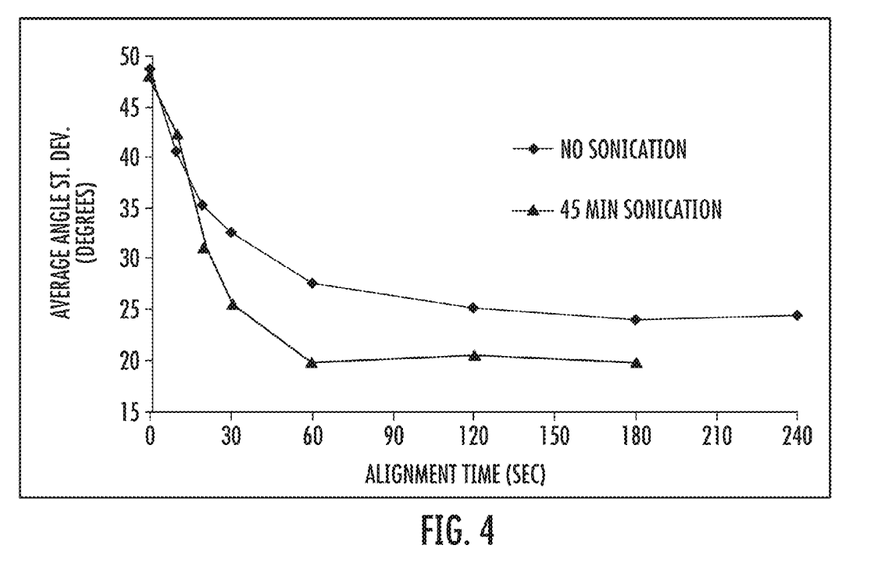
FIG. 4 is a trend line of time dependent standard deviation from the alignment of a mechanically mixed/sonicated CNF/ epoxy sample and a mechanically mixed only sample in a 1 Hz-9 kV/cm DC electric field pulse, wherein the sonicated sample shows a shorter time to stability and higher level of uniformity.

Referring now to FIGS. 3 and 4, in order to identify the effect of field strength on nanostructure alignment in a low conductivity matrix, the alignment angles of fibrous nanocarbons in the exemplary admixture were identified using the setup of FIG. 1 and the standard deviation of the alignment angles was then calculated at different times. As will be understood, if all fibrous nanocarbons were perfectly aligned in parallel relation, the standard deviation of the angles should be reduced to zero. FIG. 3 illustrates that the standard deviation of the nanostructures in the exemplary admixture is gradually reduced towards zero as the electric field exposure time increases. FIG. 3 also illustrates that the application of stronger electrical fields can reduce the time needed for achieving good alignment of high-aspect-ratio nanostructures. Sonication is believed to help disperse nanostructures into the matrix material. FIG. 4 illustrates that subjecting the admixture to sonication as part of the admixture blending procedure also may improve the speed and quality of the particle alignment.

As best seen in FIG. 2, in accordance with one exemplary practice, it has been found that the electric field alignment of high-aspect-ratio nanostructures such as fibrous nanocarbons and the like within a liquid matrix as previously described may be carried out with the admixture disposed within an ultra-porous medium 24 such as a cellulosic or polymer sponge material defining a substantial internal void volume so as to permit storage of the admixture. In this regard, while sponge material may be desirable for many applications, it is likewise contemplated that other porous containment media such as fibrous textiles, nonwoven batting and the like also may be used. In practice, the ultra porous medium 24 acts as a containment carrier for the liquid admixture during the alignment procedure. However, the admixture may nonetheless be expelled following alignment as will be described hereinafter.

In accordance with one exemplary setup as shown in FIG. 2, the sponge material or other ultra-porous medium 24 may be disposed between the charge plate 20 and the ground plate 22 such that the through thickness dimension of the sponge material is generally aligned with the electric field (FIG. 1). A dam structure 26 such as sealant tape or the like may be disposed along lateral sides of the sponge material and a removable porous peel layer 28 may be disposed across the underside of the sponge material if desired to facilitate transference of the admixture in a later step as will be described. If desired, a heating element 30 may be provided so as to maintain the temperature within the sponge material at levels providing relatively low viscosity of the liquid matrix material in the sponge material.

Of course, it is to be understood that the arrangement illustrated in FIG. 2 is merely exemplary, and virtually any arrangement which permits the containment of the admixture within the electrical field may be used. By way of example only, and not limitation, it is contemplated that the use of an ultra-porous medium 24 may be eliminated if the admixture is disposed within a suitable container which prevents leakage without interfering with the electric field. Thus, while the use of an ultra-porous medium 24 during particle alignment may be useful for many applications, such an ultra-porous medium 24 is not necessarily essential. By way of example only and not limitation, the use of thin filming equipment or the like may work well to avoid the use of the ultra-porous medium since there is not substantial excess material.

Figure 5:
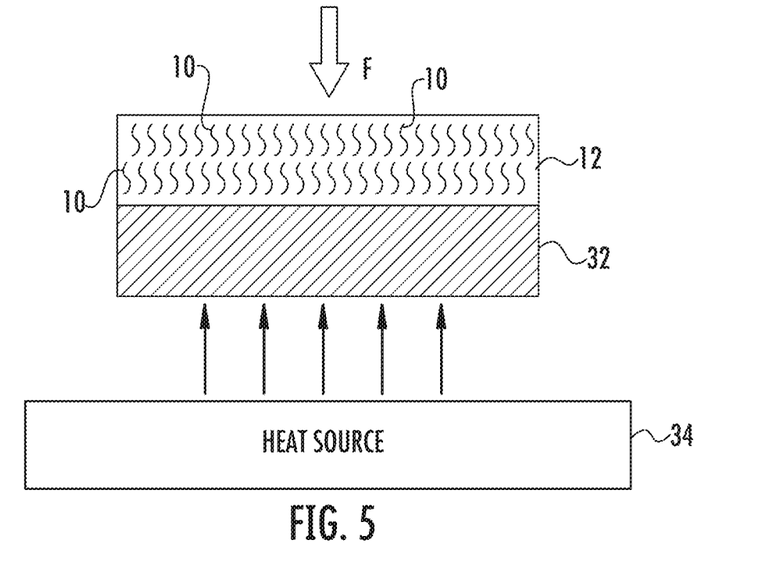
FIG. 5 is a schematic view illustrating transference of an admixture with aligned high-aspect ratio nanostructures into a receiving porous medium such as carbon fabric, FRP, E-Glass or the like characterized by some degree of porosity to permit flow in the through-thickness dimension.
Figure 6:
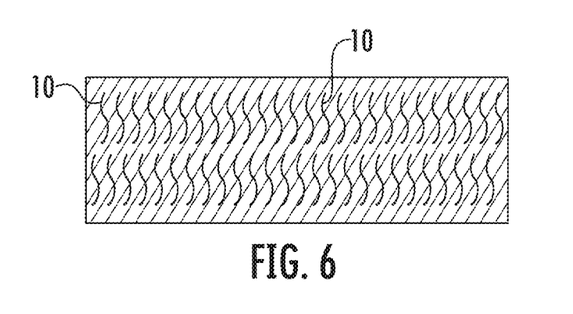
FIG. 6 is a schematic cross-sectional view illustrating a receiving porous medium following forced transference of an admixture with aligned high-aspect ratio nanostructures as illustrated in FIG. 5.

FIGS. 5 and 6 are schematic views illustrating forced transference of an admixture with aligned nanostructures 10 such as fibrous nanocarbons or the like into a receiving porous medium 32 such as carbon fiber fabric, E-glass or the like characterized by some degree of porosity to permit flow in the through-thickness dimension. In this regard, the admixture being transferred has previously undergone an alignment procedure such as an electric field alignment as described such that the high-aspect-ratio nanostructures are substantially aligned in the direction of flow into the receiving porous medium 32. Preferably, the high-aspect-ratio nanostructures have a level of alignment such that the average angle standard deviation is less than about 30 degrees, and more preferably less than about 20 degrees.

As indicated previously, the receiving porous medium may be a so called micro-scale fiber system such as a fabric or the like wherein a majority of fibers in the system are characterized by effective diameters in the micro-scale range from 1 micrometer to 1000 micrometers. It is also contemplated that fibers in such a micro-scale fiber system may be micro-diameter ropes characterized by diameters in the micro-scale range formed from nanostructures (such as nanotubes twisted together to form micro-diameter yarns). By way of example only, and not limitation, the receiving porous medium may be a micro-scale fiber system such as a fabric or the like formed from materials such as glass fibers, carbon fibers, aramid fibers, polymer fibers (e.g., nylon and polyethylene), natural fibers (e.g., flax, jute, sisal, bamboo), boron fibers, nanotube twisted yarns, nanofiber twisted yarns, spun nanotube microfibers, spun nanofiber microfibers, ceramic fibers or any combination thereof.

As illustrated, a directional heat source 34 may be used to apply heat to the side of the receiving porous medium 32 facing away from the admixture. It is believed that such a directional heat source may facilitate flow of the admixture into and through the receiving porous medium by maintaining the temperature at the interface between the admixture and receiving porous medium 32 as well as in the receiving porous medium 32 within a range providing relatively low viscosity of the liquid matrix material 12 in the admixture. As will be appreciated, by maintaining the liquid matrix material in a relatively low viscosity state, flow into the receiving porous medium may be facilitated. Such directional heating source can also help to maintain the temperature in the admixture before the interface within the range that is beneficial to preserve the alignment of nanostructures in the admixture before moving to the interface and the receiving porous medium 32.

An applied force may be exerted against the admixture so as to promote flow in the desired flow direction. By way of example only, and not limitation, such force may be in the form of pressure force, shear force, gravity force, electrical force, magnetic force, intermolecular forces, and forces for flow in porous medium, and the like. The applied forces may act on any component of the admixture such as the nanostructures, the matrix material, other added ingredients (such as other fillers, surfactants, chemical reaction agents, etc.) or any combination of the components of the admixture.

As best seen in FIG. 6, it has been found that following transference of the admixture into the receiving porous medium 32, the alignment of the high-aspect-ratio nanostructures 10 along the flow direction is substantially maintained. The high-aspect ratio nanostructures 10 thus establish a stitched through relation relative to the receiving porous medium 32 wherein the nanostructures are aligned substantially in the flow direction of the admixture into the receiving porous medium 32.

Figure 7:
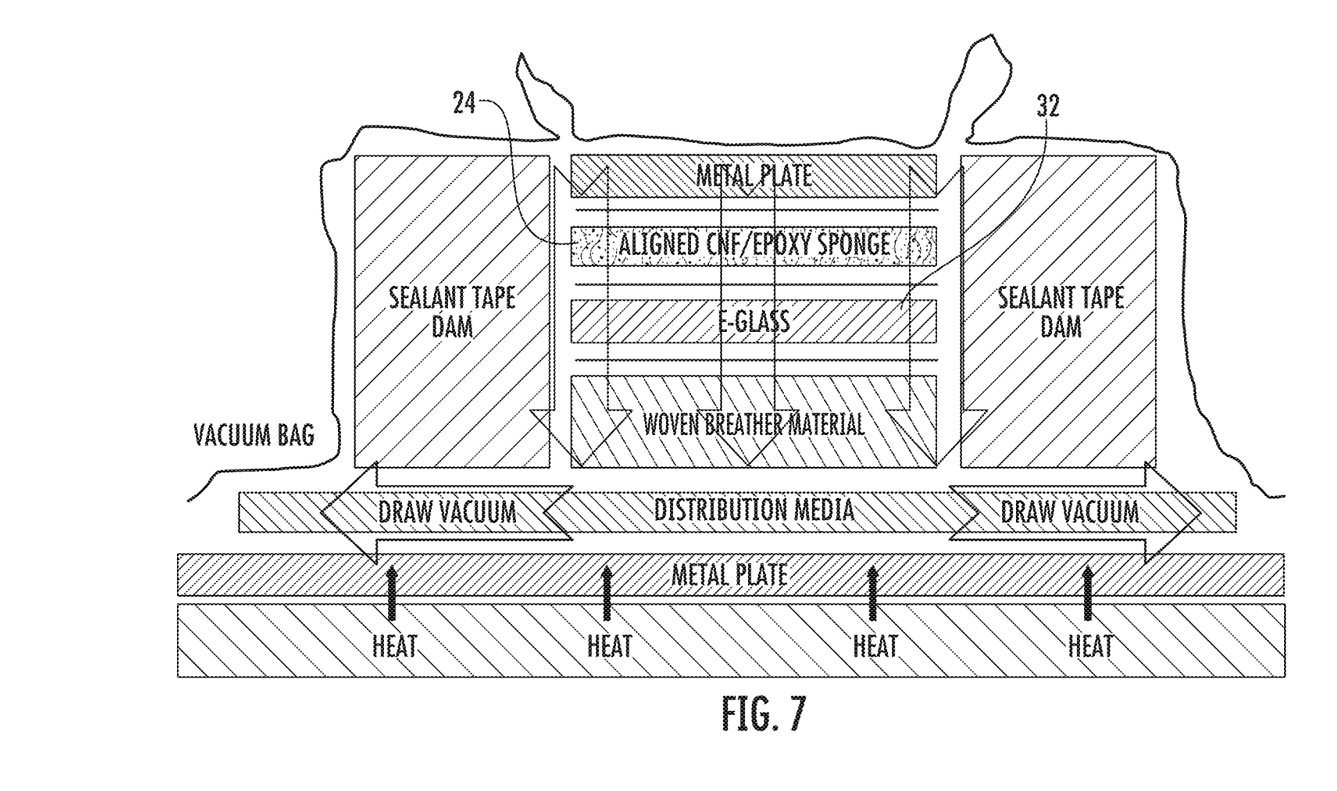
FIG. 7 is a schematic view illustrating one exemplary vacuum-based assembly for forced transference of an admixture with aligned high-aspect ratio nanostructures from a first porous medium into one or more adjacent layers of a receiving porous medium characterized by some degree of porosity to permit flow in the through-thickness dimension.

By way of example only, and not limitation, FIG. 7 is a schematic view illustrating one exemplary vacuum-based assembly for forced transference of an admixture with aligned high-aspect-ratio nanostructures into one or more layers of a receiving porous medium such as E-glass fabric or the like characterized by some degree of porosity to permit flow in the through-thickness dimension. In accordance with the illustrated, exemplary practice, the admixture with aligned fibrous nanocarbons or other high-aspect-ratio particles within epoxy or other matrix may be transferred into a micro-scale fiber system (E-glass, carbon fiber, etc.), by returning the admixture to a liquid state and transferring the liquid-state mixture into an adjacent micro-scale fiber system which acts as a receiving porous medium 32. If desired, the porous peel-ply 28 (FIG. 2) may be disposed at the interface between a sponge or other ultra-porous medium 24 containing the admixture and the micro-scale fiber system or other receiving porous medium 32 so as to facilitate ease of detachment following transference. In practice it has been found that even following reliquefaction and transference of the admixture into the receiving porous medium 32, the high-aspect-ratio nanostructures may substantially maintain their alignment in the flow direction. In this regard, it has been found that transference by gradual, laminar flow substantially promotes such alignment maintenance.

In accordance with the exemplary practice illustrated in FIG. 7, a collapsing vacuum bag system was used for liquid transfer of an aligned fibrous nanocarbon and epoxy admixture into adjacent layers of a receiving porous medium 32 in the form of an E-glass fiber system. Of course, any other suitable receiving porous medium may be used. As illustrated, during transference, heat may be applied from the bottom side of the assembly by a hot plate so the matrix melting process of the aligned admixture was intentionally controlled to start from the side close to the receiving porous medium. Concurrently with reliquefaction, the fibrous nanocarbon and epoxy admixture was immediately driven into the E-glass micro-scale fiber system by a unidirectional compression caused by the pressure difference between the atmospheric pressure and the vacuum pressure inside the vacuum bag.

When using a solid state aligned admixture, The controlled interface liquefaction process by heating from one side of the setup is believed to further enhance the stability of the alignment control of fibrous nanocarbons while being transferred into the micro-scale fiber system. Specifically, as the localized liquefaction takes place at the surface of the solid admixture, portions of the high-aspect ratio nanostructures will remain locked within the surrounding solid phase matrix material as the freed tips of those nanostructures are drawn with the surrounding liquid-phase matrix towards the receiving porous medium. This causes the fibrous nanocarbons or other high-aspect-ratio nanostructures to be pulled in the direction of flow transfer until the base ends are finally released as the surrounding matrix undergoes a return to liquid state. That is, a temperature gradient in the flow direction translates to a favorable viscosity gradient which aids in alignment.

Of course, it is to be understood that the vacuum bag process illustrated in FIG. 7 is merely exemplary, and any number of other transfer systems may likewise be utilized and may be more suitable for mass production processes. By way of example only, and not limitation, such alternative transfer systems may include rolling, compression, stamping, tapered-die-pultrusion, and similar processes that can provide unidirectional flow during the transfer of the liquefied admixture along the alignment direction of the high-aspect ratio nanostructures.

Figure 8:
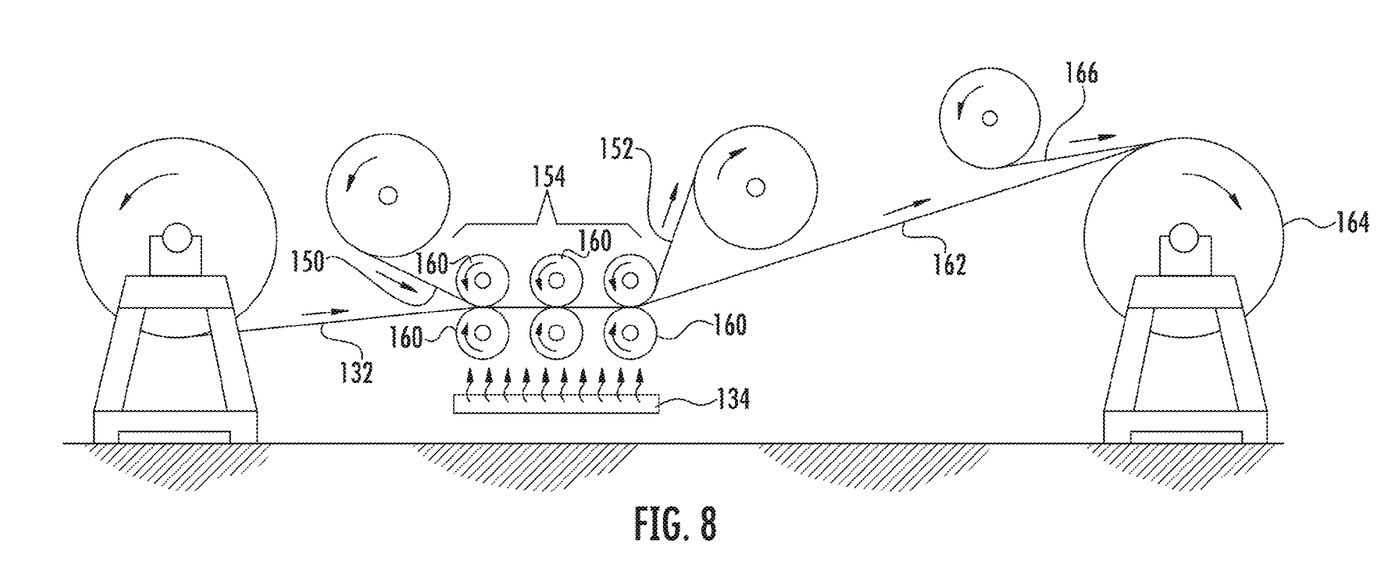
Figure 9:
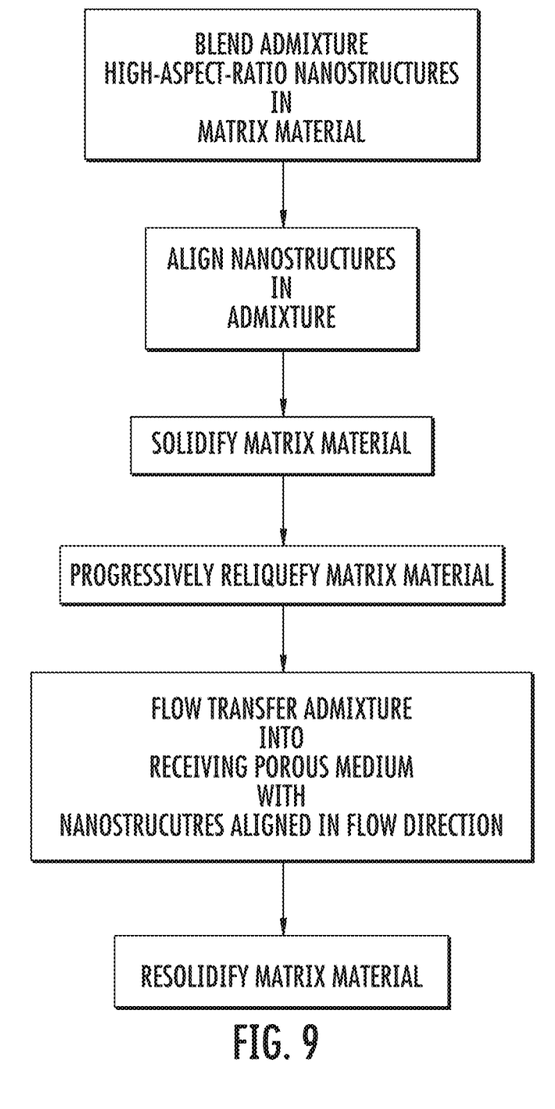
FIG. 9 is a flow chart illustrating exemplary steps admixture alignment and flow transference into a receiving medium for formation of a composite.

By way of example only, and not limitation, FIG. 8 schematically illustrates one exemplary commercial scale system for flow transference of a solid state film 150 formed from an admixture of aligned fibrous nanocarbons or other high-aspect-ratio nanostructures within a resin matrix material into a receiving porous medium 132 such as E-Glass, carbon fiber fabric or the like. In the exemplary system of FIG. 8, the solid state film 150 with a removable film separating layer 152 such as wax paper or the like is delivered to a transfer station 154 in substantially juxtaposed relation to the receiving porous medium 132. The admixture forming the solid state film 150 has previously been subjected to an alignment procedure such as electric field alignment with the resin matrix material in the liquid state as described. The admixture with aligned nanostructures is formed into a film for ease of handling. As will be appreciated, the film separating layer 152 may be positioned across one side of the film 150 to prevent layers of the film from sticking together when formed into a roll structure. As shown, upon delivery to the transfer station 154, the film separating layer 152 will face away from the receiving porous medium 132.

As illustrated, within the transfer station heat may be applied by a heat source 134 directed towards the underside of the receiving porous medium 132 facing away from the solid state film 150. In this regard, the heat source 134 may be of any suitable form including, by way of example only, a radiant heater, a forced air heater or the like. It is also contemplated that rolls or other force application elements at the underside of the receiving porous medium may be heated if desired. If desired, forced cooling may be applied across the upper side of the solid state film facing away from the receiving porous medium 132. By way of example only, and not limitation, such forced cooling may be applied by the use of forced air cooling, chilled rollers or the like.

As described previously, the application of directional heat against the underside of the receiving porous medium 132 may be used to cause the solid state film 150 to liquefy at the interface between the receiving porous medium 132 and the solid state film 150 thereby causing the admixture from the solid state film to flow into and across the receiving porous medium 132. The application of forced cooling across the upper surface of the solid state film 150 may be useful in maintaining the solid state character of the film at positions remote from the interface, thereby promoting a more gradual directional liquefaction of the solid state film 150 starting at the interface and moving outwardly away from the interface. As indicated previously, such a gradual, controlled liquefaction may help maintain alignment of high-aspect-ration nanostructures during transference. In the exemplary system of FIG. 8, the transfer station may include an arrangement of multiple force application rolls 160 to facilitate transfer of the liquefied admixture into the receiving porous medium 132. Of course, virtually any other force application technique as may be desired may likewise be used.

In the illustrated exemplary process, once the transference of admixture material into the receiving porous substrate has been completed, the film separating layer 152 may be removed. The composite 162 of the receiving porous medium 132 infused with the admixture making up the solid state film may then be allowed to cool to facilitate resolidification of the matrix material prior to delivery to a take-up roll 164. If desired, a composite separating layer 166 such as wax paper or the like may also be delivered to the take-up roll 164 to prevent layers of the composite from sticking together.

Aspects of the present disclosure may be further understood through reference to the following non-limiting examples.

Example 1

Figure 10:
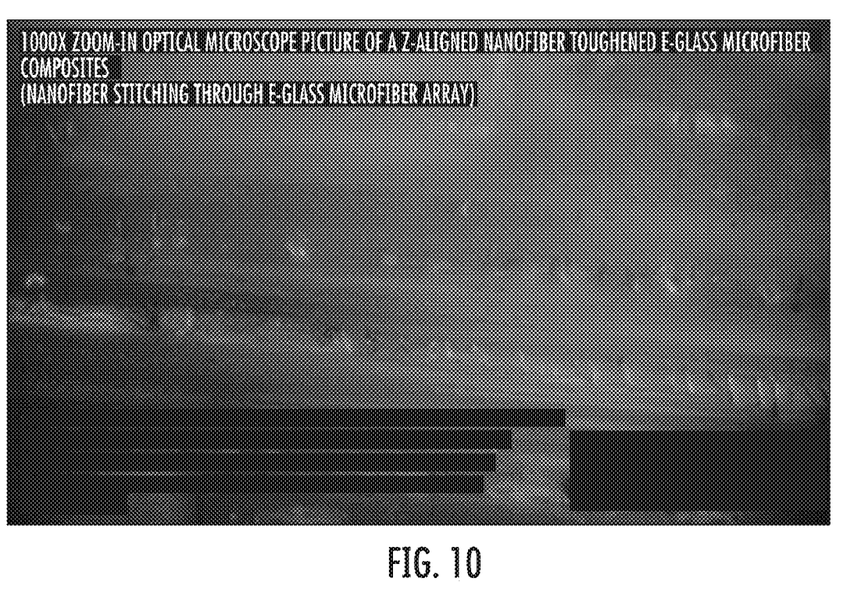
FIG. 10 is a photomicrograph illustrating Z-aligned nanofiber disposed in an E-glass microfiber composite resulting from the procedure of FIG. 9.

A micro-scale E-glass fiber system was modified to remove the horizontal (weft) E-glass fiber tows so microscopy analysis could be performed on individually cut-out vertical fiber tows. The vacuum force set-up of FIG. 7 was then used to transfer a previously aligned admixture of fibrous nanocarbons and EPON® 852 epoxy from an ultra porous sponge into the micro-scale E-glass fiber system. The resulting composite was then fully cured to yield a single layer composite of E-glass fiber and EPON® 852 epoxy matrix with fibrous nanocarbons aligned predominantly in the through-thickness direction. FIG. 10 shows a detailed photomicrographic image of the fractured single layer composite of E-Glass fiber system/EPON852/z-aligned fibrous nanocarbons at high magnification. As shown in FIG. 10, the fibrous nanocarbons were substantially aligned in the through-thickness-direction of the composite and many fibrous nanocarbons also stitched through the E-Glass fiber array.

Example 2

The manufacturing method of Example 1 was repeated in all respects but replacing the E-glass fiber system with a carbon fiber system. CNF alignment and through thickness stitching on the carbon fiber array resulted.

Example 3

Figure 11:
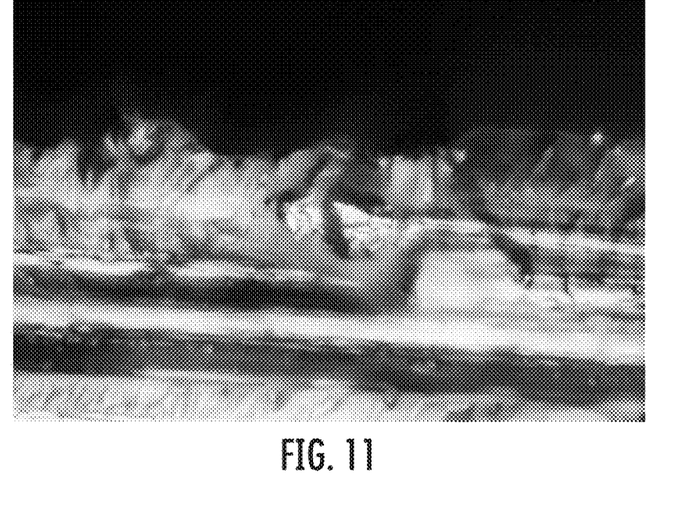
FIG. 11 is a photomicrograph illustrating carbon nanofibers extruded through the surface of a carbon fiber/epoxy prepreg.
Figure 12:
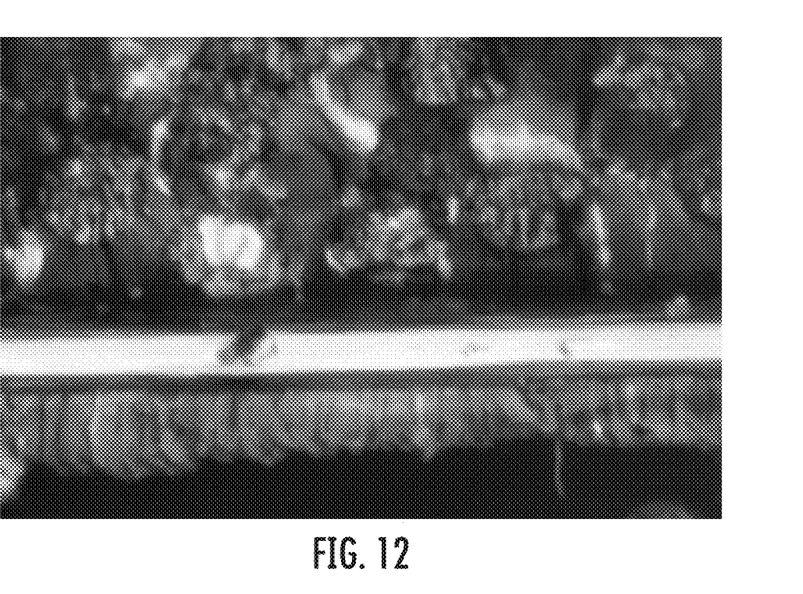
FIG. 12 is a photomicrograph illustrating a composite laminate of two z-aligned carbon nano-fiber stitched prepregs.

A composite laminate was formed of two Z-aligned CNF stitched prepregs of carbon fiber within epoxy. The individual prepregs were each prepared using electric field induced alignment of carbon nanofibers within epoxy followed by transfer into a micro-scale carbon fiber array using a vacuum force set-up as described in relation to FIG. 7. As illustrated in FIG. 11, in the resultant solidified CNF aligned prepegs, CNFs will extend through the surface. Two or more such preformed prepregs may then be consolidated into a composite laminate by localized remelting at an interface between the prepregs followed by solidification to form a fused structure. A resulting laminate structure is illustrated in FIG. 12. In FIG. 12, the large circles are micro-scale carbon matrix fibers in one layer oriented generally in the "X" direction projecting out of the figure. The horizontal cylinder is a micro-scale carbon matrix fiber in the adjacent prepreg layer. As illustrated, a portion of CNFs from the prepregs extend in stitched relation across the interface between the prepreg layers.

Of course, variations and modifications of the foregoing are within the scope of the present disclosure. Thus, it is to be understood that the disclosure disclosed and defined herein extends to all alternative combinations of two or more of the individual features mentioned or evident from the text and/or drawings. All of these different combinations constitute various alternative aspects of the present disclosure.

What is claimed is:

1. A method for manufacturing a nano-structured, multi-scale, composite comprising the steps of:
   (a) providing an admixture containing high-aspect-ratio nanostructures dispersed within a matrix material, wherein the admixture is in a solid state or physically contained, and wherein the dispersed high-aspect-ratio nanostructures are aligned in a flow transfer direction;
   (b) flow-transferring said admixture into a receiving porous medium while maintaining the alignment of the high-aspect-ratio nanostructures, wherein the receiving porous medium has a through-thickness dimension/direction and a degree of porosity permitting flow in the through-thickness dimension/direction and wherein the through-thickness dimension/direction corresponds to the flow transfer direction; and
   (c) solidifying said matrix material within the receiving porous medium to form a composite having a through-thickness dimension/direction, such that the high-aspect-ratio nanostructures are substantially aligned in the through-thickness dimension/direction of the composite.

2. The method of claim 1, wherein the admixture is physically contained in a porous medium and flow-transferred into the receiving porous medium.

3. The method of claim 2, wherein the porous medium has a porosity greater than the receiving porous medium.

4. The method of claim 1, wherein the receiving porous medium comprises micro-scale structures oriented transverse to the flow transfer direction.

5. The method of claim 1, wherein the admixture is in a solid-state and is temporarily liquified when flow-transferred into the receiving porous medium.

6. The method of claim 1, wherein the high-aspect-ratio nanostructures are aligned by application of an electrical or magnetic field.

7. The method of claim 1, wherein the high-aspect-ratio nanostructures are fibrous nanocarbons.

8. The method of claim 7, wherein the high-aspect-ratio nanostructures are fibrous nanocarbons selected from the group consisting of carbon nanofibers, carbon nanotubes, carbon nanorods, and combinations thereof.

9. The method as recited in claim 1, wherein the matrix material comprises a polymer.

10. The method as recited in claim 9, wherein the polymer is selected from the group consisting of epoxy, polyester, vinyl ester, bismaleimides, polyimides, cyanate ester, polyether ether ketone, polyphenylene sulfide, polysulfone, and combinations thereof.

11. The method as recited in claim 1, wherein the receiving porous medium comprises a micro-scale fiber system having a majority of fibers within the micro-scale range and wherein at least a plurality of the fibers in the micro-scale fiber system are oriented with length dimensions transverse to the flow transfer direction.

12. The method as recited in claim 11, wherein the micro-scale fiber system is selected from the group consisting of glass fibers, carbon fibers, aramid fibers, polymer fibers, natural fibers, boron fibers, nanotube twisted yarns, nanofiber twisted yarns, spinning nanotube microfibers, spinning nanofiber microfibers, ceramic fibers, and combinations thereof.

13. The method as recited in claim 1, wherein the flow-transferring step includes the application of a compressing force to the admixture.

14. The method as recited in claim 1, wherein the admixture is in a solid-state, and the flow-transferring step includes liquefaction of the matrix material.

15. The method as recited in claim 14, wherein during the flow-transferring step liquefaction begins at a surface of the admixture facing towards the receiving porous medium and progresses outwardly towards an outer surface of the admixture facing away from the receiving porous medium.

16. The method as recited in claim 14, wherein liquefaction is caused by application of heat.

17. The method as recited in claim 14, wherein during liquefaction, the outer surface of the admixture facing away from the receiving porous medium is forcibly cooled to reduce the rate of liquefaction.

18. A method for manufacturing a nano-structured, multi-scale, composite comprising the steps of:
   (a) providing an admixture structure containing high-aspect-ratio nanostructures dispersed within a matrix material, wherein the admixture is in a solid state, and wherein the dispersed high-aspect-ratio nanostructures are aligned in a flow transfer direction;
   (b) flow-transferring said admixture into a receiving porous medium concurrently with a liquefying step while maintaining the alignment of the high-aspectratio nanostructures, wherein the receiving porous medium has a through-thickness dimension/direction and a degree of porosity permitting flow in the through-thickness dimension/direction, wherein the through-thickness dimension/direction corresponds to the flow transfer direction, wherein said liquefying step liquefies the matrix material in the flow transfer direction of the admixture in a progressive manner; wherein liquefaction of the matrix material begins at a surface of the admixture facing towards the receiving porous medium and progresses outwardly towards an outer surface of the admixture facing away from the receiving porous medium during the flow-transferring; and (c) solidifying said matrix material within the receiving porous medium to form a composite having a through-thickness dimension/direction such that the high-aspect-ratio nanostructures are substantially aligned in the through-thickness dimension/direction of the composite.

* * * * *